United States Patent [19]
Paul

[11] 3,881,123
[45] Apr. 29, 1975

[54] PULSE TRANSMITTER ESPECIALLY FOR BRAKE SLIPPAGE CONTROL INSTALLATIONS IN MOTOR VEHICLES

[75] Inventor: Jürgen Paul, Stuttgart, Germany

[73] Assignee: Daimler-Benz Aktiengesellschaft, Stuttgart-Unterurkheim, Germany

[22] Filed: Jan. 2, 1974

[21] Appl. No.: 429,818

Related U.S. Application Data
[63] Continuation of Ser. No. 177,755, Sept. 3, 1971, abandoned.

[30] Foreign Application Priority Data
Sept. 4, 1970 Germany............................ 2043842

[52] U.S. Cl................................... 310/168; 310/67
[51] Int. Cl. .......................................... H02k 19/29
[58] Field of Search ....... 310/67, 90, 168, 75, 75 A, 310/66, 479, 191, 264, 170, 768; 64/6

[56] References Cited
UNITED STATES PATENTS
3,596,122  7/1971  Stewart................................ 310/67
3,652,886  3/1972  Riordan et al...................... 310/168
3,746,902  7/1973  Hetzel................................. 310/67
3,764,837  10/1973  Burckhardt et al................ 310/168

*Primary Examiner*—Donovan F. Duggan
*Attorney, Agent, or Firm*—Craig & Antonelli

[57] ABSTRACT

A pulse transmitter, in particular for brake slippage control installations in motor vehicles, in which a rotating part cooperates with a magnetizable non-rotating part by means of axially directed teeth or the like, and in which the change in magnetic field serves for detecting the rotary condition of the wheel whereby the non-rotating part is accurately supported in the rotating part in the radial and possibly also in the axial direction and is connected with an axle stub by way of a joint-like intermediate element capable of absorbing any eccentricity between the same.

19 Claims, 6 Drawing Figures

PATENTED APR 29 1975  3,881,123

PULSE TRANSMITTER ESPECIALLY FOR BRAKE SLIPPAGE CONTROL INSTALLATIONS IN MOTOR VEHICLES

This is a continuation of application Ser. No. 177,755 filed Sept. 3, 1971, now abandoned.

The present invention relates to a pulse transmitter intended in particular for brake slippage control installations in motor vehicles, in which a rotating part cooperates with a magnetizable non-rotating part by means of an axially directed teeth or the like and the change in magnetic field serves for the determination of the rotary condition of the wheel.

With brake slippage control installations the aforementioned pulse transmitters are frequently utilized, i.e., an inductive velocity measurement takes place whereby the frequency of the alternating current superimposed on the direct current in the winding is a measurement for the rotational speed. For constructive reasons, for example, for space reasons, the teeth are frequently arranged axially with such types of pulse transmitters. With these pulse transmitters having axial toothed arrangements, however, an error may occur in the measurement. More particularly, if an eccentricity exists between the axis of the stationary part and that of the rotating part, then the point of engagement of the entrainment spring changes during the rotation. With a constant angular velocity of the wheel, the angular velocity of one toothed rim changes as a result thereof in relation to the other. During one rotation, the correct velocity would then be measured only at two places. Between these two places, a phase of higher velocity and a phase of lower velocity would exist, i.e., the pulse transmitter would simulate in such a case accelerations and decelerations.

The present invention is concerned with the task to avoid the aforementioned disadvantage. Accordingly, a pulse transmitter is proposed which indicates in all cases the correct velocity over an entire rotation, also when an accentricity exists which is constructively unavoidable.

The underlying problems are solved with the pulse transmitters of the aforementioned type in that the non-rotating part is accurately supported in the rotating part in the radial and possibly also in the axial direction and is non-rotatably connected with the axle stub by a joint-like intermediate member for the absorption of the eccentricity. The reverse case would also be feasible thereby, i.e., the rotating toothed arrangement would have to be accurately supported with respect to the non-rotating part secured at the stationary axle stub in the radial and possibly in the axial direction and would have to be non-rotatably connected with the rotating part by way of a joint-like intermediate member for absorbing the eccentricity. Consequently, the present invention is predicated on the general concept to assure by corresponding joint-like intermediate members either at the non-rotating or at the rotating part a concentric running of the two toothed arrangements.

The construction according to the present invention entails the advantage that no measuring errors can now occur any longer. The pulse transmitter indicates in every case the correct angular velocity of the wheel.

The present invention prefers a construction according to which the intermediate member consists of a pin arranged transversely in the axle stub and of two springs which are secured at each pin end and extend essentially axially and with the other ends thereof engage joint-like at the non-rotating part. In that connection, the present invention proposes such a construction of these two springs that they permit a slight axial movement. As a result thereof, the change in length of the spring can be absorbed which occurs during lateral deflection. Suitable therefor are, for example, springs with an S-shaped construction, hair-pin springs or the like.

In one embodiment of the present invention, the cross pin is arranged in the axle stub so as to be rotatable and longitudinally displaceable about the cross pin axis and in the direction of the cross pin axis, respectively, and the springs are constructed laterally rigid and rotatably connected in the non-rotating part. Leaf springs are suited best for that purpose which extend from the cross pin approximately parallel to the axle stub—taking into consideration their shape—up to the non-rotating part.

Toothed arrangements are already known for such types of pulse transmitters in which the toothed rims slide one upon the other. The tooth gaps in the toothed arrangement are thereby filled with a gliding material. In that case, a further development of the present invention resides in that the springs serve simultaneously for producing the abutment pressure at the toothed rims. In a further embodiment according to the present invention, the springs are thereby angularly bent approximately at right angle whereby one leg is disposed approximately parallel to the axis and the other approximately perpendicular to the axis.

Accordingly, it is an object of the present invention to provide a pulse transmitter intended in particular for brake slippage control installations of motor vehicles which avoids by simple means the aforementioned shortcomings and drawbacks encountered in the prior art.

Another object of the present invention resides in a pulse transmitter, intended in particular for brake slippage control installations in motor vehicles which assures at all times an accurate measurement of the rotational speed of a wheel.

A further object of the present invention resides in a pulse transmitter which eliminates error signals, yet is simple in construction and easy to install.

These and other objects, features, and advantages of the present invention will become more apparent from the following description when taken in connection with the accompanying drawing which shows, for purposes of illustration only, two embodiments in accordance with the present invention, and wherein.

Figure 1:
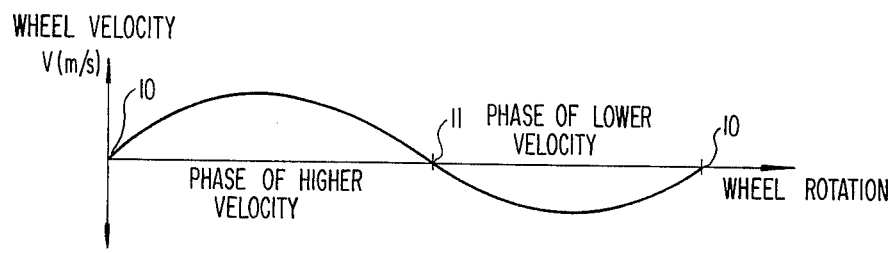
FIG. 1 is a diagram for explaining the simulated acclerations and decelerations as occur in prior art pulse transmitters.

Referring now to the drawing wherein like reference numerals are used throughout the various views to designate like parts, and more particularly to FIG. 1, if an eccentricity occurs at the teeth, then the measuring curve assumes the configuration corresponding to the illustration in FIG. 1, i.e., within one wheel rotation, the true wheel velocity is indicated only at the places 10 and 11. In the phases disposed therebetween, wheel accelerations or wheel declerations are simulated corresponding to the illustrated curve. Under certain circumstances, an inaccuracy would enter the brake slippage control installation.

Figure 2:
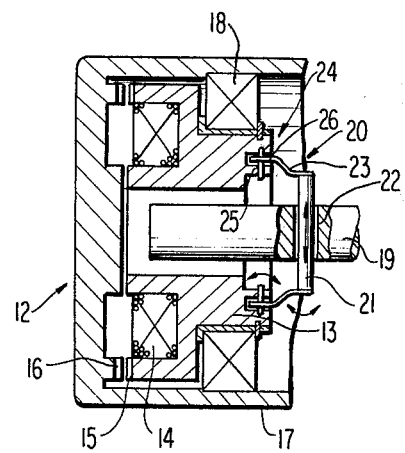
FIG. 2 is an axial cross-sectional view through a pulse transmitter in accordance with the present invention.

According to FIG. 2, the pulse transmitter generally designated by reference numeral 12 essentially consists of a non-rotating part 13 which receives a winding 14 and includes an axially directed toothed arrangement 15. A corresponding toothed arrangement 16 at the rotating part 17 cooperates with this toothed arrangement 15.

The non-rotating part 13 is accurately supported in the rotating part 17 by means of a bearing 18 so that the teeth 15, 16 rotate accurately with respect to one another. However, in order to compensate for any eccentricity between the non-rotating part 13 and the fixed axle 19, a joint-like intermediate element generally designated by reference numeral 20 is interconnected between these two parts. The non-rotating part 13 is nonrotatably held by means of this joint-like intermediate part 20.

The joint-like intermediate element 20 consists of a cross pin 21 which is arranged in a bore 22 of the axle or shaft 19 so as to be rotatable without play and longitudinally displaceable in the direction of its own axis. Leaf springs 23 are secured at both ends of the cross pin 21 which are constructed laterally rigid. They engage with their ends by means of the joints generally designated by reference numeral 24 at the non-rotating part 13. These joints 24 are constituted in the instant embodiment by pins 25 in the non-rotating part 13 which engage in corresponding bores 26 provided at the leaf spring ends.

Figure 3B:
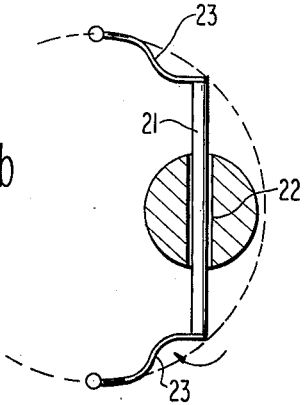
FIGS. 3a to 3c are somewhat schematic elevational views of certain details of a pulse transmitter according to the present invention, for purposes of explaining the operation thereof.
Figure 3A:
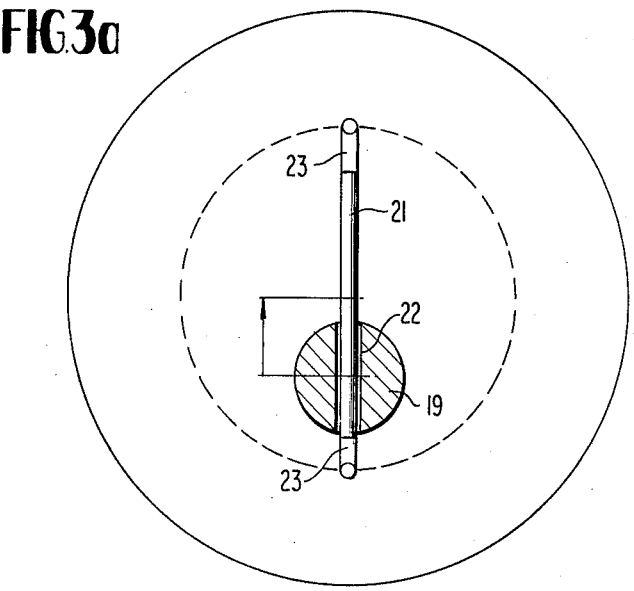
Figure 3C:
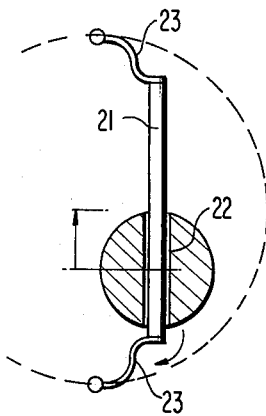

The operation can be readily seen from FIGS. 3a to 3c whereby of course, the eccentricity is indicated strongly exaggerated. FIGS. 3a to 3c represent different positions which occur in case of a given eccentricity all within one rotation of a wheel.

In the case of the position according to FIG. 3a, the pin 21 is exclusively displaced in the bore 22 of the shaft 19 whereas the springs 23 exhibit no deformation. In the case of FIG. 3b, the pin 21 has to rotate in its bore 22. Additionally, the springs 23 are thereby slightly elongated. In order to enable this, the springs are constructed in that case slightly S-shaped. However, it is also possible to utilize flat elongated leaf springs and to construct the bores 26 at their ends as elongated apertures. The position 3c shows an intermediate position whereby the pin 21 is simultaneously rotated and displaced in its bore 22. Additionally, also in that case a slight elongation of the springs 23 occurs.

Figure 4:
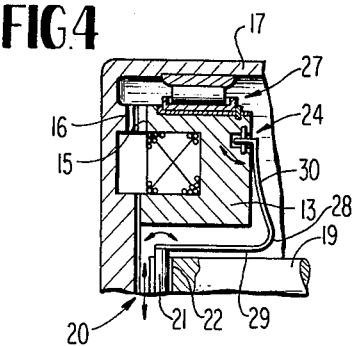
FIG. 4 is a partial axial cross-sectional view through a modified embodiment of a pulse transmitter with toothed rims sliding one upon the other in accordance with the present invention.

According to FIG. 4, the non-rotating part 13 is again accurately supported in the rotating part 17 by means of a needle bearing generally designated by reference numeral 27. The toothed arrangements 15 and 16 are now constructed as toothed arrangements sliding one upon the other, i.e., the tooth gaps thereof are filled with a sliding material. A joint-like intermediate element generally designated by reference numeral 20 serves for holding fast the non-rotating part 13 whose cross pin 21 is arranged in the bore 22 of the shaft 19 in the manner already described. The two springs are constructed as angularly shaped leaf springs 28 whose one leg 29 extends approximately axially and whose other leg 30 extends approximately radially. The engagement of the springs at the non-rotating part 13 takes place again by joint places generally designated by reference numeral 24.

In the instant case, the two springs 28 simultaneously provide the abutment pressure for the two toothed arrangements 15 and 16. It is assured thereby that these toothed arrangements cannot carry out any axial movements relative to one another.

While I have shown and described only two embodiments in accordance with the present invention, it is understood that the same is not limited thereto but is susceptible of numerous changes and modifications as are known to those skilled in the art, and I therefore do not wish to be limited to the details shown and described herein, but intend to cover all such changes and modifications as are encompassed by the scope of the appended claims.

What I claim is:

1. A pulse transmitter, intended in particular for brake slippage control installations in motor vehicles, in which a rotating part cooperates with a magnetizable non-rotating part by toothed means, and in which the change in magnetic field serves for the detection of the rotary condition of a wheel, characterized by support means accurately supporting the non-rotating part in the rotating part in the radial direction, and joint-like intermediate connecting means connected to one of said two parts to continuously assure concentric rotation of the two toothed means with respect to one another during operation of the pulse transmitter.

2. A pulse transmitter according to claim 1, characterized in that said support means accurately supports the non-rotating part in the rotating part also in the axial direction.

3. A pulse transmitter, intended in particular for brake slippage control installations in motor vehicles, in which a rotating part cooperates with a magnetizable non-rotating part by toothed means, and in which the change in magnetic field serves for the detection of the rotary condition of a wheel, characterized by support means accurately supporting the non-rotating part in the rotating part in the axial direction, and joint-like intermediate connecting means non-rotatably connecting the non-rotating part with an axle stub for absorbing any existing eccentricity therebetween to continuously assure the concentric rotation of the two toothed means with respect to one another during changing radial loads experienced by the axle stub during operation of the transmitter.

4. A pulse transmitter according to claim 3, characterized in that said support means accurately supports the non-rotating part in the rotating part also in the radial direction.

5. A pulse transmitter, intended in particular for brake slippage control installations in motor vehicles, in which a rotating part cooperates with a magnetizable non-rotating part by toothed means, and in which the change in magnetic field serves for the detection of the rotary condition of a wheel, characterized by support means accurately supporting the non-rotating part in the rotating part in the radial direction, and joint-like intermediate connecting means non-rotatably connecting the non-rotating part with an axle stub for absorbing any existing eccentricity therebetween, said intermediate connecting means including a pin arranged transversely in the axle stub and two spring means which are each secured at a respective pin end and extend at least approximately axially, and which engage at the other ends thereof at the nonrotating part.

6. A pulse transmitter according to claim 5, characterized in that said two spring means are so connected that they permit a slight axial movement.

7. A pulse transmitter according to claim 6, characterized in that the cross pin is arranged in the axle stub so as to be rotatable and longitudinally displaceable about the cross pin axis and the direction of the cross pin axis, respectively, and in that the spring means are constructed laterally rigid and are pivotally connected in the non-rotating part.

8. A pulse transmitter according to claim 7, with toothed means sliding one upon the other, characterized in that the spring means simultaneously serve for producing the abutment pressure at the toothed means.

9. A pulse transmitter according to claim 8, characterized in that the spring means are approximately bent at right angle whereby one leg portion extends approximately parallel to the axis and the other approximately perpendicular to the axis.

10. A pulse transmitter according to claim 9, characterized in that said spring means are leaf springs.

11. A pulse transmitter according to claim 5, with toothed means sliding one upon the other, characterized in that the spring means simultaneously serve for producing the abutment pressure at the toothed means.

12. A pulse transmitter according to claim 11, characterized in that the spring means are approximately bent at right angle whereby one leg portion extends approximately parallel to the axis and the other approximately perpendicular to the axis.

13. A pulse transmitter according to claim 5, characterized in that said spring means are leaf springs.

14. A pulse transmitter according to claim 5, characterized in that the cross pin is arranged in the axle stub so as to be rotatable and longitudinally displaceable about the cross pin axis and the direction of the cross pin axis, respectively, and in that the spring means are constructed laterally rigid and are pivotally connected in the non-rotating part.

15. A pulse transmitter according to claim 1, characterized in that the connecting means is connected with an axle stub and includes a pin arranged transversely in the axle stub, the axle stub being displaceable in the direction of the longitudinal axis of the pin.

16. A pulse transmitter according to claim 3, characterized in that the connecting means includes a pin arranged transversely in the axle stub such that the axle stub is displaceable in the direction of the longitudinal axis of the pin.

17. A pulse transmitter according to claim 3, characterized in that the toothed means are arranged for cooperation in the axial direction.

18. A pulse transmitter according to claim 1, characterized in that the toothed means of the rotating part and the nonrotating part are axially opposed.

19. A pulse transmitter according to claim 3, characterized in that the axle stub is a non-rotatable axle.

* * * * *